United States Patent

[11] 3,584,885

| [72] | Inventor | Johann Oberndorfer<br>Oberursel, Taunus, Germany |
|------|----------|---|
| [21] | Appl. No. | 833,933 |
| [22] | Filed | June 17, 1969 |
| [45] | Patented | June 15, 1971 |
| [73] | Assignee | Metallgesellschaft Aktiengesellschaft |
| [32] | Priority | July 6, 1968 |
| [33] | | Germany |
| [31] | | G 6 750 292 |

[54] SEALING DEVICE FOR ROTARY VESSELS SUCH AS KILNS
1 Claim, 1 Drawing Fig.

[52] U.S. Cl. .................................................. 277/82, 308/36.3
[51] Int. Cl. .................................................. F16k 41/00
[50] Field of Search .......................................... 277/81, 82, 134, 133; 308/36.2, 36.3

[56] References Cited
UNITED STATES PATENTS

| 2,906,565 | 9/1959 | Scherba .................. | 277/81X |
| 2,992,842 | 7/1961 | Sheuchenko et al. ......... | 277/81X |

*Primary Examiner*—Laverne D. Geiger
*Assistant Examiner*—Robert I. Smith
*Attorney*—Burgess, Dinklage & Sprung ABSTRACT: A rotary kiln is sealed against the infiltration of air and the escape of gases and dust by means of a slip ring seal. One ring is mounted on the housing and the other is mounted about the periphery of the rotating kiln. The two are urged into firm sliding engagement by means of a series of compressed air-cylinders acting on points about the edge of the stationary ring.

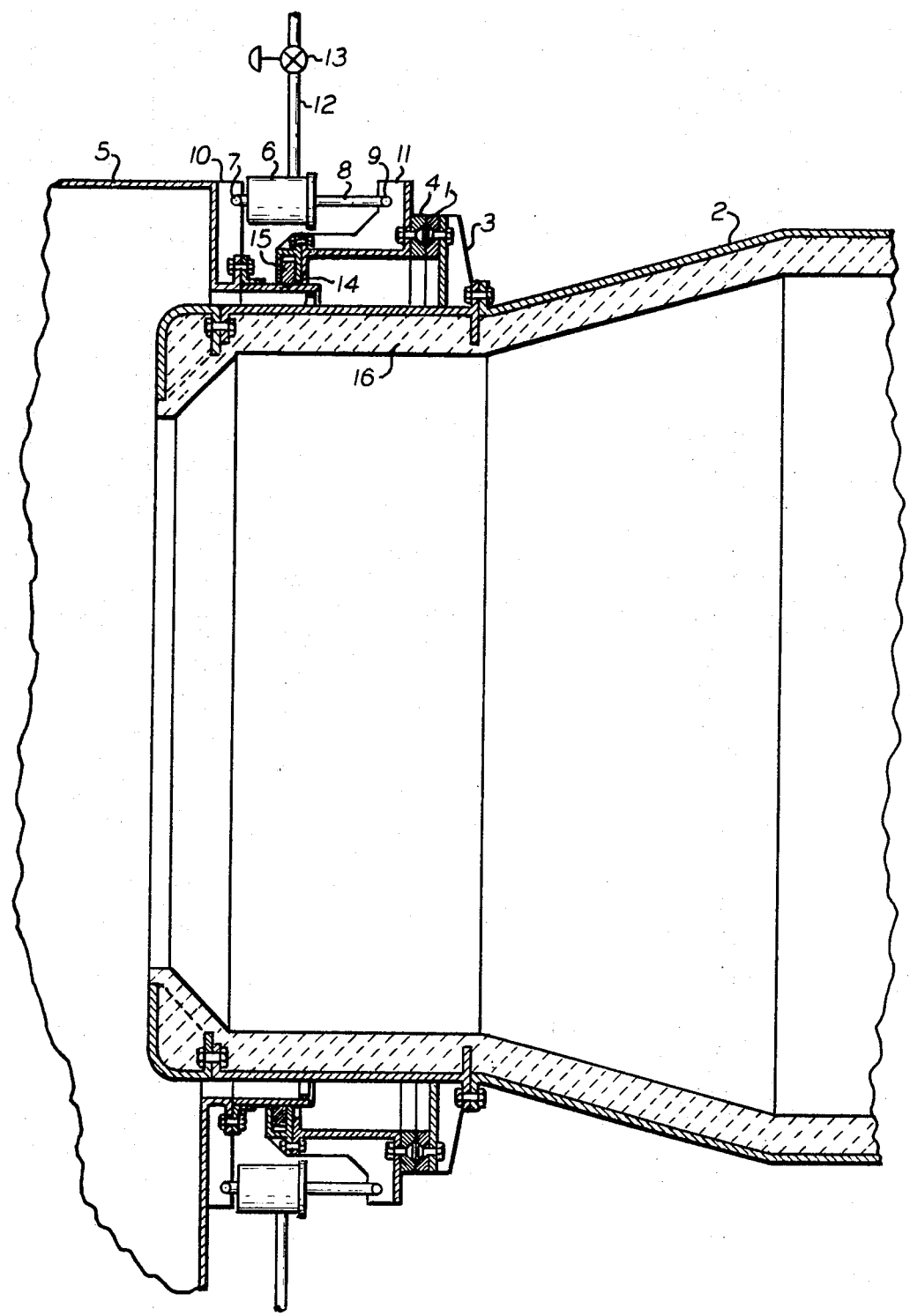

SEALING DEVICE FOR ROTARY VESSELS SUCH AS KILNS

DESCRIPTION

A good seal of the annular gaps existing between the stationary and movable parts of rotary drums and rotary kilns is required to prevent an infiltration of air and an escape of dust containing exhaust gases. Such infiltration and escape would disturb a good utilization of heat and a controlled reaction in the rotary kiln. This is of special significance with rotary kilns which are operated under subatmospheric pressure.

It is known to use spring urged slip ring seals to cover the annular gaps existing between the inlet and outlet ends and the stationary housing parts of rotary kilns and rotary drums.

Such sealing devices have the disadvantage, however, that the temperatures to which the coil springs are exposed result in fatigue so that the spring force is greatly reduced over a period of time. The longitudinal expansion of the rotating vessel during operation is considerable and this causes the coil springs to be greatly compressed which combined with the heat fatigue results in the spring force of the individual springs decreasing in different amounts in the course of time with the result that different contact pressure is exerted about the periphery of the rotating vessel.

It has also been proposed to seal the fixed part of a rotating vessel relative to the movable part with the aid of labyrinth seals. However, because the sealing elements are stationary, there is a relatively large clearance between the shell of the rotary vessel provided with such devices and the sealing ring so that the rotary vessel can expand in its diameter and in length. On the other hand, air can infiltrate and dust containing exhaust gases can escape through that airgap.

According to this invention, a sealing member or ring is mounted on the stationary housing part of a rotary vessel and is forced by a plurality of compressed air cylinders carried by the stationary housing of the rotary vessel against a corresponding sealing member or ring which is firmly mounted on the shell of the rotary vessel.

The compressed air cylinders are suitably connected by a common conduit so that the required contact pressure is adjustable by a simple regulating valve.

THE DRAWING

FIG. 1 is a longitudinal sectional view showing a rotary kiln.

In the rotary kiln 2, shown with a refractory lining 16, an annular sealing element 1 of cast iron is secured to a bracket 3 by bolts with sunken heads. The bracket is firmly mounted on the shell 2 of the rotary kiln. Another sealing element 4 of cast steel is connected to a bracket 11, also with sunken bolts, which bracket is mounted on the stationary housing part 5 for movement along the axis of the rotary kiln. A plurality of compressed air cylinders 6 are pivotally mounted by a hinge 7, and pistons 8 are pivotally mounted by the hinges 9, to the annular brackets 10 and 11 of the stationary part 5 of the rotary kiln. Bracket 11 is carried by collar 14 of part 5, which has a compressible seal 15 to permit limited movement of the bracket along the axis of the vessel. The cylinders are supplied by compressed air from line 12 which contains regulator valve 13. On the side which faces the movable part 2 of the rotary kiln, the bracket 11 carries the sealing element 4, which is forced by the compressed air cylinder 6 against the sealing element 1 when the rotary kiln is in operation. A lubricant such as a graphite past can be used between the rings 1 and 4. The rings will usually have a contact width of 120 to 250 millimeters.

The number of pneumatic cylinders will vary with the size of the kiln which at the point illustrated will usually have a diameter of about 1 to 8 meters. Usually 6 to 12 cylinders will be used to give a sealing force of about 0.05 to 1 kilogram per square centimeter.

The advantage which is achieved according to the invention resides particularly in that it is possible with the aid of this device to maintain a constant optimum contact pressure between the sealing elements which seal the annular gaps in spite of different thermal expansions of the movable parts of the rotary vessel during the heat process so that an optimum sealing effect is combined with a minimum wear of the sealing elements.

I claim:

1. In apparatus having a large rotating circular vessel mating with a stationary mounting member, the improvement comprising two mating ring seals, one being stationary and mounted on said mounting member and the other being mounted about the periphery of said vessel and adapted for sliding engagement with each other, and pneumatic cylinders about the periphery of the stationary seals and acting against said mounting members to maintain said seals in firm but sliding engagement, said stationary ring seal being pivotally mounted at points on a collar about the end of said vessel and mounted on said mounting member, the pivoted mounting permitting limited movement of the seal along the axis of the vessel.